(12) United States Patent
Takahashi (10) Patent No.: US 7,383,126 B2
(45) Date of Patent: Jun. 3, 2008

(54) NAVIGATION SYSTEM AND INTERSECTION GUIDANCE METHOD

(75) Inventor: Tohru Takahashi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 279 days.

(21) Appl. No.: 11/142,011

(22) Filed: Jun. 1, 2005

(65) Prior Publication Data

US 2005/0273256 A1 Dec. 8, 2005

(30) Foreign Application Priority Data

Jun. 2, 2004 (JP) ............................. 2004-164245

(51) Int. Cl.
*G01C 21/30* (2006.01)
*G08G 1/123* (2006.01)

(52) U.S. Cl. ................... 701/211; 340/995.2; 701/209; 701/35; 701/36; 701/117

(58) Field of Classification Search ................ 701/209, 701/211; 340/995.2
See application file for complete search history.

(56) References Cited

U.S. PATENT DOCUMENTS

| | | | | |
|---|---|---|---|---|
| 5,729,109 A * | 3/1998 | Kaneko et al. | ............. | 318/587 |
| 5,739,772 A * | 4/1998 | Nanba et al. | ............... | 340/990 |
| 5,874,905 A * | 2/1999 | Nanba et al. | ............ | 340/995.2 |
| 6,018,697 A * | 1/2000 | Morimoto et al. | .......... | 701/209 |
| 6,035,253 A * | 3/2000 | Hayashi et al. | ............. | 701/211 |
| 6,134,501 A * | 10/2000 | Oumi | ......................... | 701/209 |
| 6,249,740 B1 * | 6/2001 | Ito et al. | ...................... | 701/200 |
| 6,253,153 B1 * | 6/2001 | Kantani et al. | ............. | 701/209 |
| 6,269,303 B1 * | 7/2001 | Watanabe et al. | ........... | 701/209 |
| 6,269,304 B1 * | 7/2001 | Kaji et al. | ................... | 701/209 |
| 6,356,840 B2 * | 3/2002 | Kusama | ....................... | 701/211 |
| 6,360,168 B1 * | 3/2002 | Shimabara | ................... | 701/211 |
| 6,442,473 B1 * | 8/2002 | Berstis et al. | ............... | 701/117 |
| 6,446,000 B2 * | 9/2002 | Shimabara | ................... | 701/209 |
| 6,473,693 B1 * | 10/2002 | Kusama | ....................... | 701/211 |
| 6,510,386 B2 * | 1/2003 | Sakashita | ..................... | 701/211 |
| 6,766,233 B2 * | 7/2004 | Odinak et al. | ................ | 701/36 |
| 7,127,350 B2 * | 10/2006 | Oikubo | ......................... | 701/211 |
| 7,133,661 B2 * | 11/2006 | Hatae et al. | ............. | 455/404.1 |
| 2001/0040505 A1 * | 11/2001 | Ishida et al. | ................ | 340/435 |
| 2002/0115423 A1 * | 8/2002 | Hatae et al. | ................ | 455/404 |
| 2004/0162672 A1 * | 8/2004 | Kim | ........................... | 701/209 |
| 2005/0149262 A1 * | 7/2005 | Oikubo | ......................... | 701/211 |
| 2005/0154505 A1 * | 7/2005 | Nakamura et al. | ............. | 701/1 |
| 2005/0192723 A1 * | 9/2005 | Noguchi | ....................... | 701/35 |
| 2006/0287807 A1 * | 12/2006 | Teffer | ......................... | 701/117 |

* cited by examiner

*Primary Examiner*—Thomas G. Black
*Assistant Examiner*—Wae Louie
(74) *Attorney, Agent, or Firm*—Brinks Hofer Gilson & Lione (57) ABSTRACT

When the vehicle approaches an intersection, traffic signals located at the intersection are displayed on an intersection view, a traffic signal to be considered is displayed in a manner so as to be identifiable from the other traffic signals, arrows in the same directions as those of arrow signals for the traffic signal to be considered are displayed; and an arrow corresponding to an arrow signal permitting the vehicle to proceed in the direction of a guidance route is displayed in a manner so as to be identifiable from the other arrows.

20 Claims, 12 Drawing Sheets

LINK RECORD

| NO. | OFFSET | DATA LENGTH | DATA FORMAT | ITEM NAME |
|---|---|---|---|---|
| 1 | 0 | 8 | ID | LINK ID |
| 2 | 8 | 2 | N | NODE NUMBER 1 |
| 3 | 10 | 2 | N | NODE NUMBER 2 |
| 4 | 12 | 2 | N | LINK DISTANCE (m) |
| 5 | 14 | 2 | N | COST |
| 6 | 16 | 1 | B | ROAD TYPE FLAG |
| 7 | 17 | 1 | B | ROAD ATTRIBUTE FLAG / LANE WIDTH INFORMATION |
| 8 | 18 | 2 | NF | HIGHWAY CODE |
| 9 | 20 | 4 | NF | ROUTE NUMBER |
| 10 | 24 | 1 | N | NUMBER OF LANES |
| 11 | 25 | 1 | N | NUMBER OF TRAFFIC SIGNALS |
| 12 | 26 | 1 | B | TRAFFIC CONTROL FLAG (FROM NODE NUMBER 1 TO NODE NUMBER 2) |
| 13 | 27 | 1 | B | TRAFFIC CONTROL FLAG (FROM NODE NUMBER 2 TO NODE NUMBER 1) |
| 14 | 28 | 1 | N | DIRECTION OF TRAVEL ALONG ROAD (FROM NODE NUMBER 1 TO NODE NUMBER 2) |
| 15 | 29 | 1 | N | DIRECTION OF TRAVEL ALONG ROAD (FROM NODE NUMBER 2 TO NODE NUMBER 1) |

FIG. 6

| CPID | INTERSECTION ID | | | |
|---|---|---|---|---|
| CPLK | INTERSECTION LINK INFORMATION | | | |
| | INTERSECTION LINK ID | LINK INFORMATION (POINTER) | | |
| | $L_0$ | $P_0$ | | |
| | $L_1$ | $P_1$ | | |
| | $L_2$ | $P_2$ | | |
| | $L_3$ | $P_3$ | | |
| | $L_4$ | $P_4$ | | |
| | $L_5$ | $P_5$ | | |

| | | | INTERSECTION SIGNAL PLACEMENT INFORMATION — CSLP | | | ARROW SIGNAL GRAPHICS INFORMATION — ARFG |
|---|---|---|---|---|---|---|
| | | | SIGNAL NUMBER | POSITION INFORMATION | FLASHING | (↙ ↖ → ↗) |
| | | | 1 | $X_1, Y_1$ | × | |
| | | | 2 | $X_2, Y_2$ | ○ | |
| | | | 3 | $X_3, Y_3$ | × | |
| | | | ... | | | ... |

GSCD

| INTERSECTION GUIDANCE VOICE INFORMATION | | |
|---|---|---|
| APPROACH LINK | EXIT LINK | GUIDANCE CODE + ARROW SIGNAL POSITION CODE |
| LINK $L_0$ | $L_1$ | DIAGONALLY DOWNWARD TO THE LEFT, FIRST ARROW FROM THE LEFT |
| | $L_2$ | LEFT TURN DIRECTION, SECOND ARROW FROM THE LEFT |
| | $L_3$ | DIAGONALLY UPWARD TO THE RIGHT, THIRD ARROW FROM THE RIGHT |
| | $L_4$ | RIGHT TURN DIRECTION, SECOND ARROW FROM THE RIGHT |
| | $L_5$ | DIAGONALLY DOWNWARD TO THE RIGHT, FIRST ARROW FROM THE RIGHT |
| LINK $L_1$ TO LINK $L_6$ | ... | |

VIEWPOINT A

FIG. 12

VIEWPOINT B

FIG. 13

NAVIGATION SYSTEM AND INTERSECTION GUIDANCE METHOD

BACKGROUND OF THE INVENTION

1. Field of the Invention

The present invention relates to navigation systems and their intersection guidance methods, and specifically to a navigation system and its intersection guidance method allowing the driver to identify a traffic signal and arrow signal to be considered at a complex intersection.

2. Description of the Related Art

A navigation system searches for and displays a guidance route to a destination on a map. When the vehicle approaches an intersection on the guidance route, the navigation system shows an intersection view on the map or on one half of a split screen, indicates by an arrow the direction of travel at the intersection, and at the same time gives the direction of travel by a voice message. There have been proposed a variety of navigation systems with intersection guidance functions (for example, see Japanese Unexamined Patent Application Publication No. 2002-174527). In this known technique, a method of indicating the remaining distance is changed according to the distance to an intersection. When the vehicle is far from the intersection, the remaining distance is indicated by a bar graph. When the vehicle approaches the intersection, a vehicle position mark, which had been displayed in a fixed position, is moved along the guidance route according to the travel of the vehicle, while an arrow indicating the direction of travel is shortened to display the remaining distance.

At a complex intersection, such as a forked (four-way, five-way, or more) intersection, the driver may be confused about which one of a plurality of visible traffic signals to consider. It may also be possible that the driver is confused, at an intersection, as to which one of multiple indication arrows (arrow signals) for a traffic signal indicates the vehicle's direction of travel, because the arrow signals are oriented in various directions. Therefore, there is a possibility that the situations described above may cause traffic accidents and congestion at an intersection.

Although known navigation systems indicate, at a forked intersection, the direction of travel by an arrow and voice message, such known navigation systems do not clearly indicate which traffic signal and arrow signal the driver should refer to with respect to the direction of travel.

SUMMARY OF THE INVENTION

In view of the disadvantages described above, an object of the present invention is to enable drivers to easily identify a traffic signal to be considered when a plurality of traffic signals is visible at a forked intersection.

Another object of the present invention is to enable drivers to easily identify which arrow signal to follow when arrow signals for a traffic signal are oriented in various directions.

The objects of the present invention can be achieved by the following first to third intersection guidance methods in a navigation system.

The first intersection guidance method includes the steps of displaying traffic signals located at an intersection on an intersection view when the vehicle approaches the intersection; and displaying a traffic signal to be considered in a manner so as to be identifiable from the other traffic signals.

The second intersection guidance method includes the steps of displaying arrows in the same directions as those of arrow signals for a traffic signal to be considered on an intersection view when the vehicle approaches an intersection; and displaying an arrow corresponding to an arrow signal permitting the vehicle to proceed in the direction of a guidance route in a manner so as to be identifiable from the other arrows.

The third intersection guidance method includes the steps of displaying traffic signals located at an intersection on an intersection view when the vehicle approaches the intersection; displaying a traffic signal to be considered in a manner so as to be identifiable from the other traffic signals; displaying arrows in the same directions as those of arrow signals for the traffic signal to be considered; and displaying an arrow corresponding to an arrow signal permitting the vehicle to proceed in the direction of a guidance route in a manner so as to be identifiable from the other arrows.

In the intersection guidance methods described above, intersection information in map data can include, with respect to each case in which any of the intersection links constituting an intersection is an approach road to the intersection, data specifying the positions of traffic signals to be displayed and a traffic signal to be considered; and, using the intersection information, the traffic signals are displayed and the traffic signal to be considered is displayed in an identifiable manner. Alternatively, intersection information in map data can include, with respect to a case in which any of the intersection links constituting an intersection is an approach road to the intersection, data for displaying arrows in the same directions as those of arrow signals for a traffic signal to be considered; and, using the intersection information, the arrows are displayed, and an arrow corresponding to an arrow signal permitting the vehicle to proceed in the direction of a guidance route is displayed in a manner so as to be identifiable from the other arrows.

In the intersection guidance methods described above, the intersection information may include voice data indicating the position of the arrow signal to be considered, and a voice message based on the voice data informs the driver of the position of the arrow signal to be considered.

In the intersection guidance methods described above, the vehicle can be monitored to determine whether or not the vehicle is close to the intersection, and the intersection view is displayed if it is determined that the vehicle is close to the intersection.

The objects of the present invention can be achieved by the following first to third navigation systems.

The first navigation system includes an intersection approach monitor detecting whether the vehicle is close to an intersection; a map data storage retrieving map data of the area around the vehicle from a map memory, and storing the map data; and a display unit displaying, using intersection information included in the map data, traffic signals located at the intersection on an intersection view when the vehicle approaches an intersection, and displaying in an identifiable manner a traffic signal to be considered in passing through the intersection.

The second navigation system includes an intersection approach monitor detecting whether the vehicle is close to an intersection; a map data storage retrieving map data of the area around the vehicle from a map memory, and storing the map data; and a display unit displaying, using intersection information included in the map data, arrows in the same directions as those of arrow signals for a traffic signal to be considered on an intersection view when the vehicle approaches the intersection, and displaying an arrow corresponding to an arrow signal permitting the vehicle to proceed in the direction of a guidance route in a manner so as to be identifiable from the other arrows.

The third navigation system includes an intersection approach monitor detecting whether the vehicle is close to an intersection; a map data storage retrieving map data of the area around the vehicle from a map memory, and storing the map data; and a display unit displaying, when the vehicle approaches an intersection, traffic signals located at the intersection on an intersection view, displaying a traffic signal to be considered in a manner so as to be identifiable from the other traffic signals, displaying arrows in the same directions as those of arrow signals for the traffic signal to be considered, and displaying an arrow corresponding to an arrow signal permitting the vehicle to proceed in the direction of a guidance route in a manner so as to be identifiable from the other arrows.

In the navigation systems described above, the intersection information can include, with respect to each case in which any of the intersection links constituting an intersection is an approach road to the intersection, information specifying the positions of traffic signals to be displayed and a traffic signal to be considered; and the display unit, using the intersection information, displays the traffic signals on an intersection view and displays the traffic signal to be considered in an identifiable manner.

In the navigation systems described above, the intersection information can include, with respect to each case in which any of the intersection links constituting an intersection is an approach road to the intersection, information specifying arrows in the same directions as those of arrow signals for a traffic signal to be considered; and the display unit, using the intersection information, displays the arrows and an arrow corresponding to an arrow signal permitting the vehicle to proceed in the direction of a guidance route in a manner so as to be identifiable from the other arrows.

The above-described navigation systems further can include a voice output unit informing the driver of the position of the arrow signal to be considered by using voice data that is included in the intersection information and indicates the position of the arrow signal to be referred to.

The above-described navigation systems further can include an intersection-view generator generating and displaying, using the intersection information, an intersection view when the vehicle approaches an intersection.

In the present invention, when the vehicle approaches an intersection, traffic signals located at the intersection can be displayed on an intersection view; and a traffic signal to be considered is displayed in a manner so as to be identifiable from the other traffic signals. This enables the driver to easily identify the traffic signal to be considered.

Moreover, in the present invention, when the vehicle approaches an intersection, arrows in the same directions as those of arrow signals for a traffic signal to be considered can be displayed on an intersection view; and an arrow corresponding to an arrow signal permitting the vehicle to proceed in the direction of a guidance route is displayed in a manner so as to be identifiable from the other arrows. This enables the driver to easily identify the arrow signal to be considered.

According to the present invention described above, a traffic signal and arrow signal to be considered at a forked intersection can be clearly indicated to the driver. This reduces the driver's stress at the intersection, and prevents the vehicle from stalling at the intersection due to the driver's errors in identifying the traffic signal and arrow signal to be considered, thereby preventing traffic accidents and congestion.

DESCRIPTION OF THE PREFERRED EMBODIMENTS

When the vehicle approaches a complex intersection, traffic signals located at the intersection can be displayed on an intersection view, and a traffic signal to be considered is highlighted so as to be identifiable from the other traffic signals. At the same time, arrows in the same directions as those of arrow signals for the traffic signal to be considered can be displayed, and an arrow corresponding to an arrow signal permitting the vehicle to proceed in the direction of a guidance route is highlighted so as to be identifiable from the other arrows. For easy identification, for example, the arrow flashes, or is displayed inverted or in a different color, in combination with voice guidance (an announcement, such as "Please refer to the XX-th arrow signal from the right"). The navigation system of the present invention thus informs the driver of the position of the arrow signal to be considered, thereby supporting the driving task.

(A) Overview of the Present Invention

Figure 1:
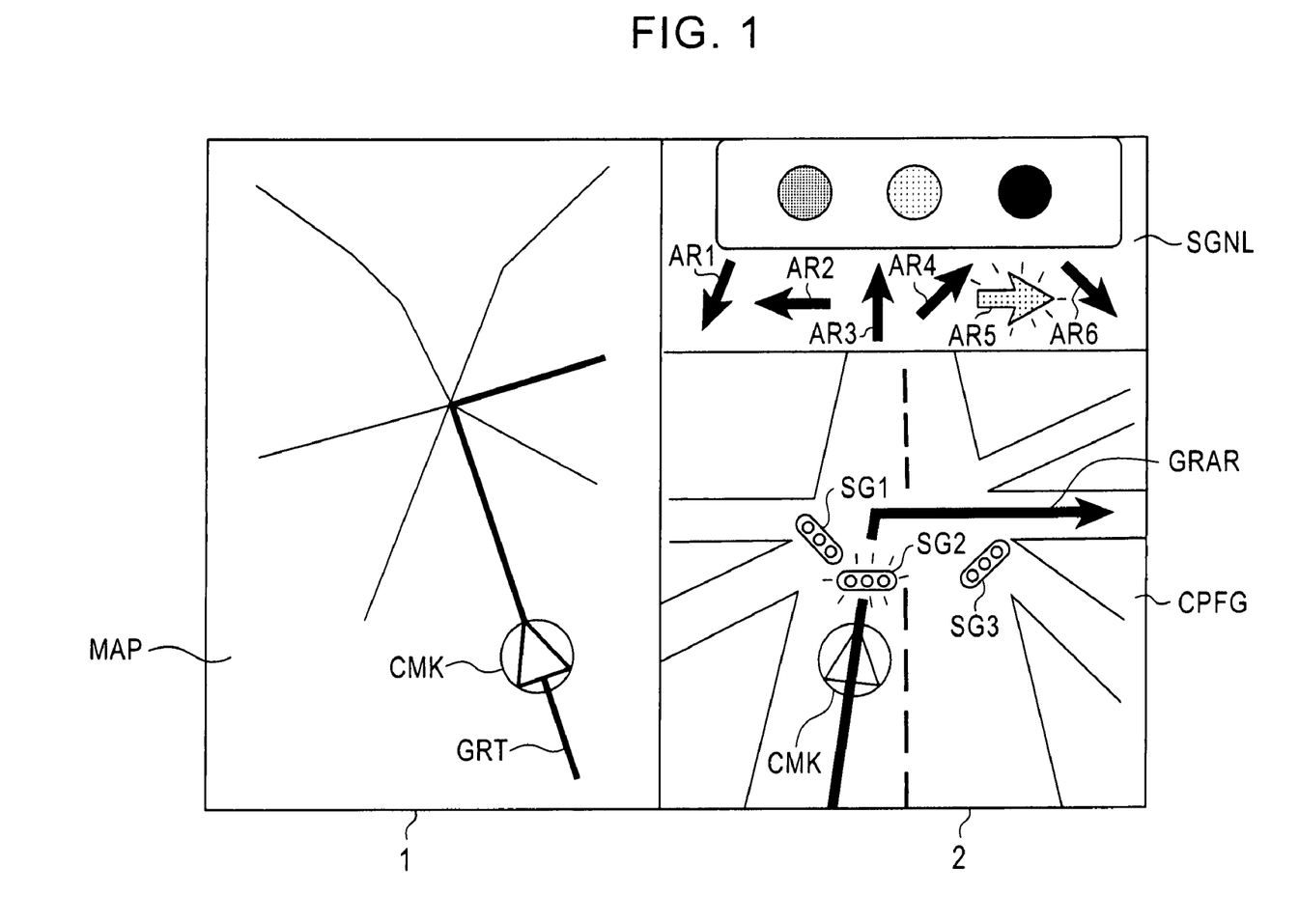
FIG. 1 shows a screen example for explaining an overview of the present invention.

FIG. 1 is a diagram for explaining an overview of the present invention and shows an example of a screen displayed when the vehicle is close to an intersection. When the vehicle approaches within a predetermined distance, such as 300 m, of an intersection, the screen is divided into two sections, one being a map screen 1 and the other being an intersection screen 2. The map screen 1 displays a map of the area around the vehicle, and a guidance route GRT and a vehicle position mark CMK are shown on the map. The intersection screen 2 shows an intersection view CPFG, a travel direction arrow GRAR indicating the direction of travel along the guidance route, and the vehicle position mark CMK. Additionally, in the present invention, the intersection screen 2 not only displays traffic signals SG1 to SG3 that can be seen from the driver on the approach to the intersection, but also highlights, using a flashing light or the like, the traffic signal SG2 the driver should consider. Moreover, the intersection screen 2 displays an enlarged view SGNL of the traffic signal SG2 to show arrows AR1 to AR6 in the same directions as those of arrow signals for the traffic signal SG2, and highlights the arrow AR5 corresponding to an arrow signal permitting the vehicle to proceed in the direction of a guidance route, in a manner so as to be identifiable from the other arrows AR1 to AR4 and AR6 (using a flashing light, reversing display, a different color, or the like). In combination with voice guidance (an announcement, such as "Please refer to the second arrow signal from the right"), the intersection screen 2 informs the driver of the position of the arrow signal that the driver should consider. This makes the traffic signal and arrow signal to be considered clearly identifiable, thereby enabling the driver to smoothly pass through the forked intersection.

FIG. 1 shows an example where the intersection screen 2 simultaneously displays both the traffic signals SG1 to SG3 and the arrows AR1 to AR6 in the same directions as those of the arrow signals for the traffic signal SG2. On the other hand, as in FIG. 2, the intersection screen 2 can display only the traffic signals SG1 to SG3 or, as in FIG. 3, the intersection screen 2 can display only the arrows AR1 to AR6 in the same directions as those of the arrow signals for the traffic signal to be considered.

(B) Structure of Navigation System

Figure 4:
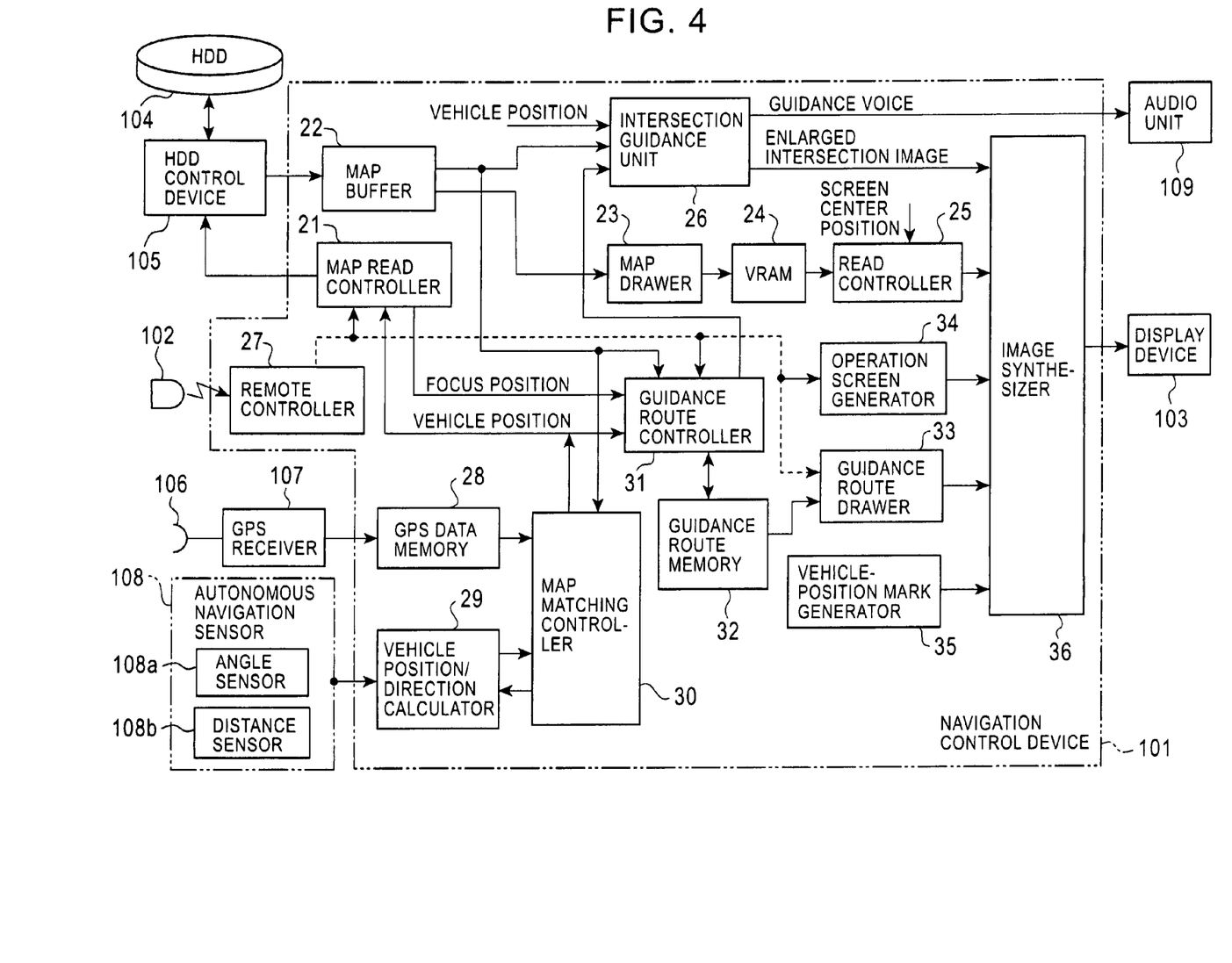
FIG. 4 shows the structure of a navigation system with intersection guidance functions of the present invention.

FIG. 4 shows the structure of the navigation system with intersection guidance functions of the present invention.

The navigation system includes a navigation control device 101, a remote 102, a display device 103 serving as a display unit, a hard disk (HDD) 104 serving as a map memory, a HDD control device 105, a multi-beam antenna 106, a global positioning system (GPS) receiver 107, an autonomous navigation sensor 108, and an audio unit 109 serving as a voice output unit. The HDD 104 contains a map database. The autonomous navigation sensor 108 includes a relative azimuth sensor (angle sensor) 108a, such as a vibration gyroscope detecting the rotation angle of the vehicle, and a distance sensor 108b emitting a pulse every predetermined distance of travel.

In the navigation control device 101, a map read controller 21 calculates a focus position (longitude and latitude at the screen center) when the map is moved or selected with a joystick key, a zoom-in key, or a zoom-out key on the remote 102, and controls the HDD control device 105, based on the vehicle position, focus (cursor) position, or the like, to retrieve appropriate map data from the HDD 104. A map buffer 22 serving as a map data storage stores map data retrieved from the HDD 104. To accommodate the scrolling of maps, the map buffer 22 stores map data in the form of a plurality of sheets (units), such as three-by-three matrix of map data, corresponding to the area around the vehicle position or focus position.

A map drawer 23 generates map images from map data stored in the map buffer 22. A video random access memory (VRAM) 24 stores map images. A read controller 25 captures a screenful of map images from the VRAM 24 differently depending on the screen center position (vehicle position or focus position), thereby allowing the scrolling of maps on the screen according to the movement of the vehicle position or focus position.

An intersection guidance unit 26 displays, as in FIG. 1, an intersection that the vehicle is approaching and controls intersection guidance. A remote controller 27 sends instructions to various parts in the navigation control unit 101 in response to signals received from the remote 102. A GPS data memory 28 stores GPS data from the GPS receiver 107. A vehicle position/direction calculator 29 calculates, based on an output from the autonomous navigation sensor 108, the vehicle position (estimated vehicle position) and the vehicle direction. A map matching controller 30 uses map data in the map buffer 22, the estimated vehicle position, and the vehicle direction to perform map matching every predetermined distance of travel (for example, 10 m) using a projection method, thereby adjusting the vehicle position to the course of travel.

A guidance route controller 31 calculates a guidance route (search route) from the point of departure to an entered destination. A guidance route memory 32 stores guidance routes. A guidance route drawer 33, while the vehicle is running, retrieves guidance route information (a series of nodes) to draw a guidance route. An operation screen generator 34 generates various menu screens (operation screens), a vehicle-position mark generator 35 generates vehicle position marks, and an image synthesizer 36 synthesizes various images to output the synthesized images.

(C) Link Information and Intersection Information

Figure 5:
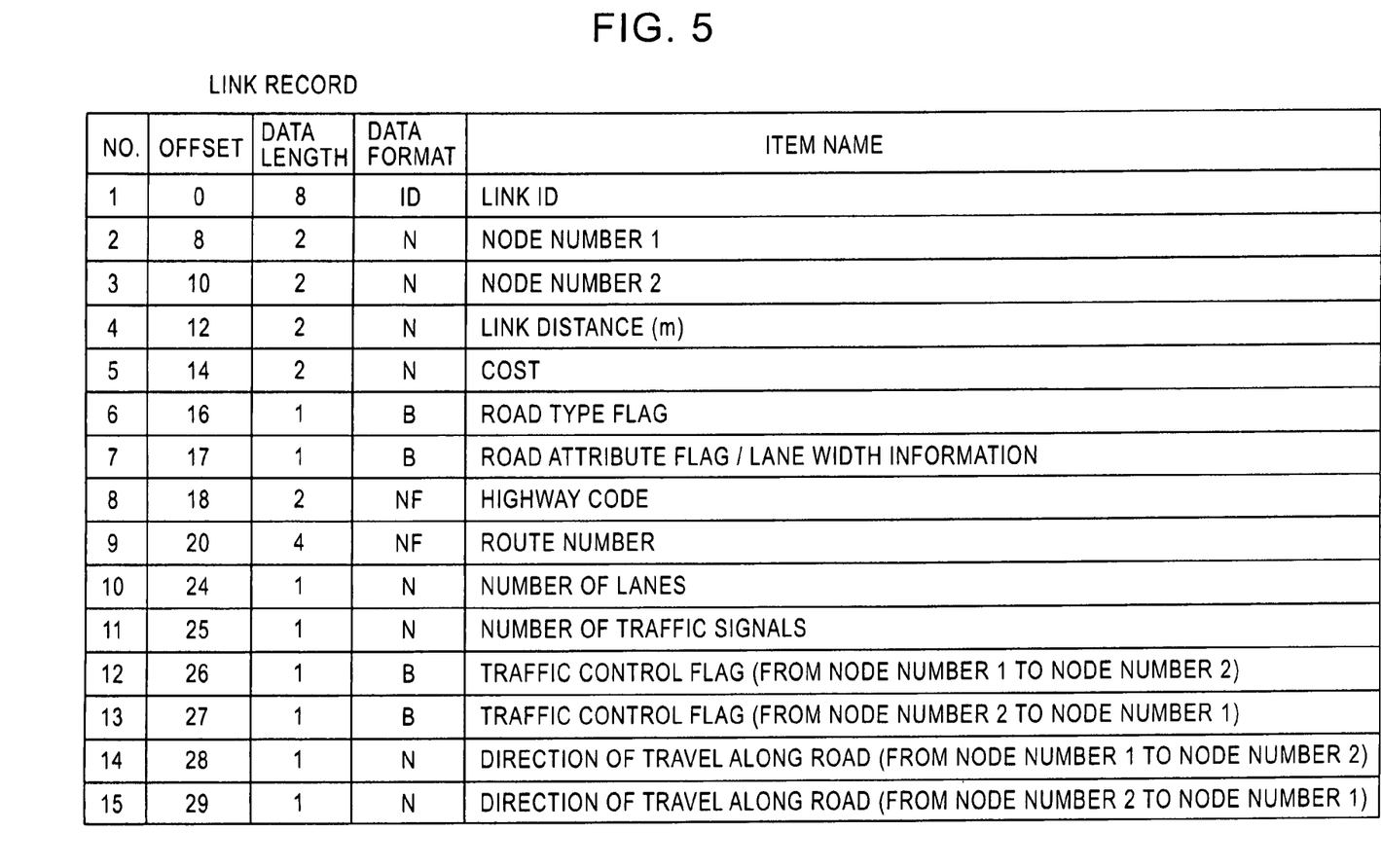
FIG. 5 explains a link record.
Figure 6:
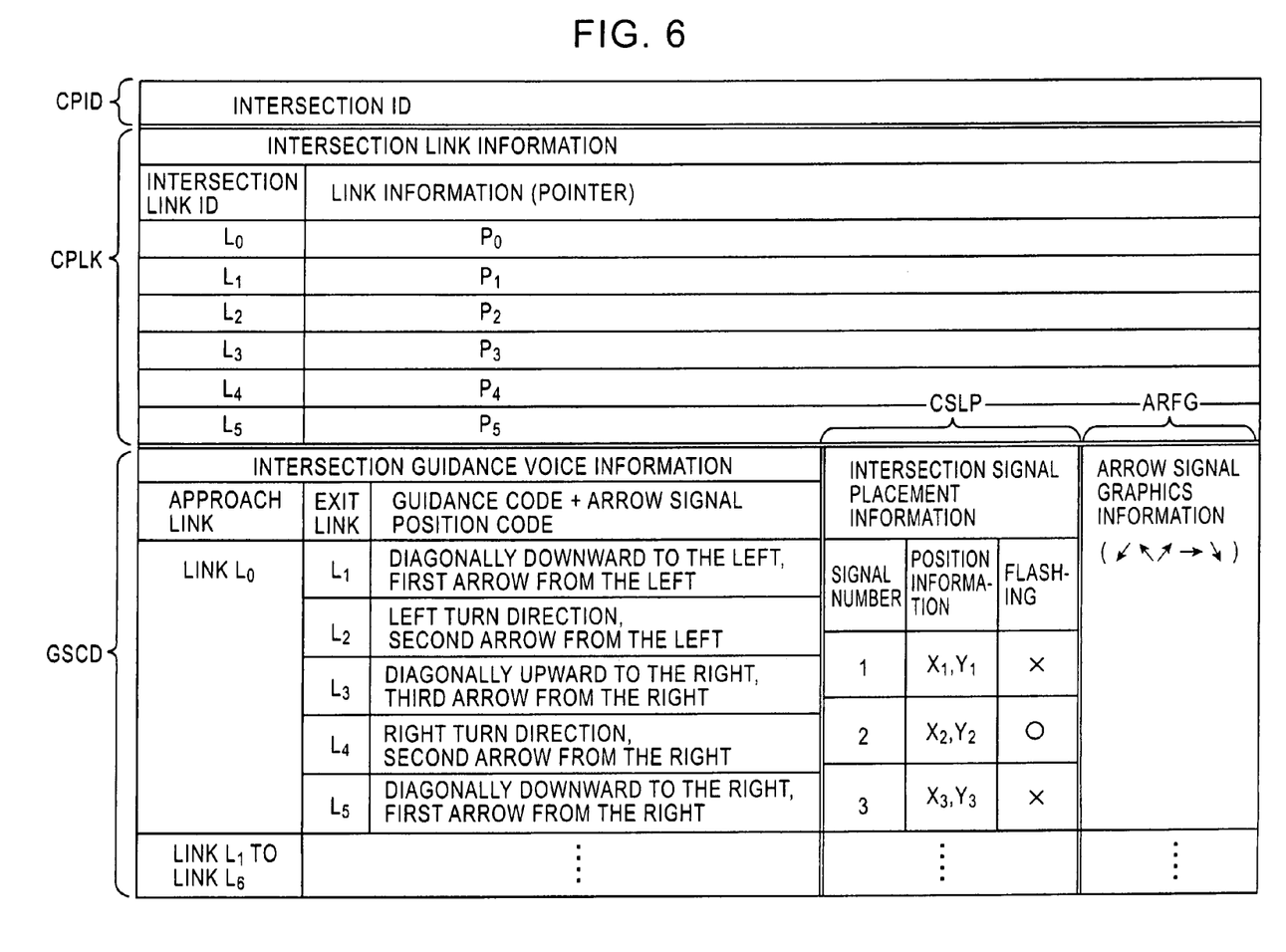
FIG. 6 explains intersection information.
Figure 7:
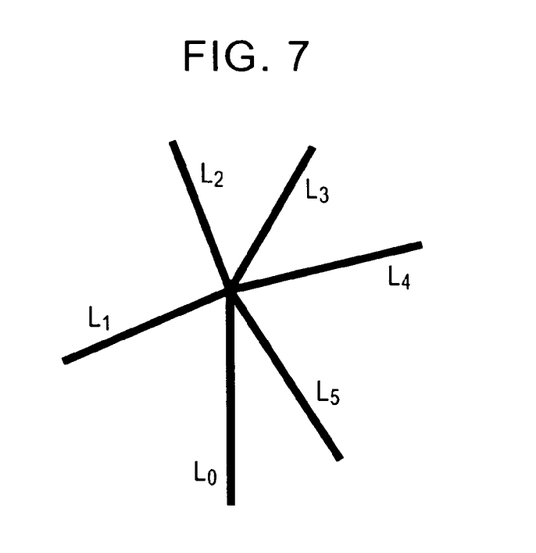
FIG. 7 shows an example of the configuration of an intersection.
Figure 8:
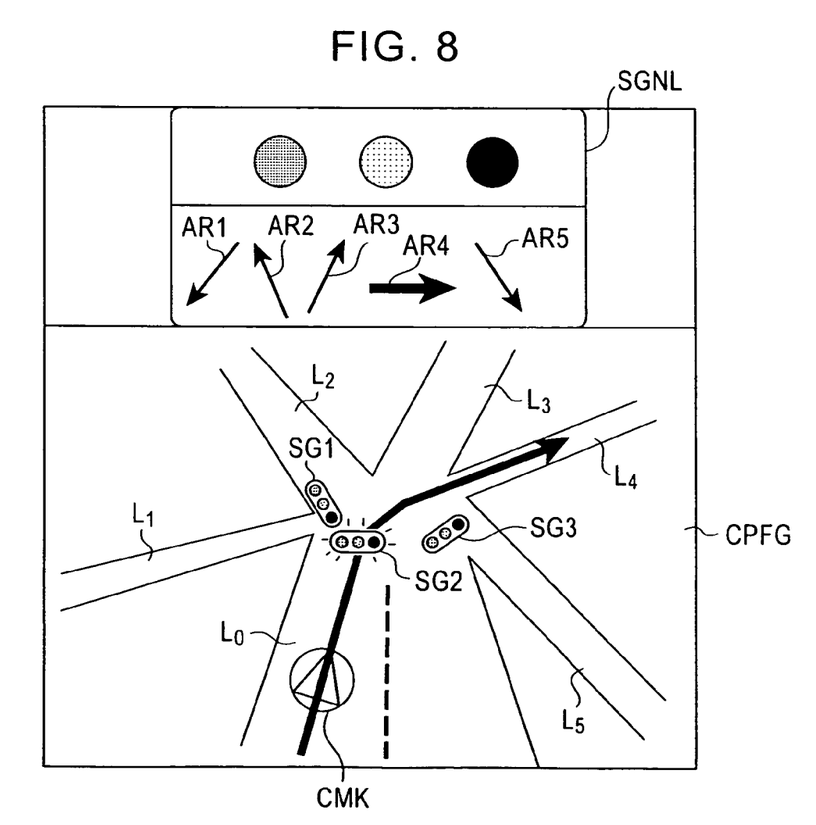
FIG. 8 is an intersection view showing the case where a link $L_0$ is an approach link when six links $L_0$ to $L_5$ constitute an intersection.

Map data includes information on nodes, links, and intersections constituting roads. FIG. 5 explains a link record, which includes data, such as a link ID, node numbers at both ends of a link, the distance of a link, a road type flag, and a traffic control flag. FIG. 6 explains intersection information for an intersection of six links $L_0$ to $L_5$ as in FIG. 7. FIG. 8 is an intersection view showing the case where the link $L_0$ is an approach link.

Intersection information includes an intersection ID (intersection number) CPID, intersection link information CPLK, guidance voice information GSCD, intersection-signal placement information CSLP, and arrow-signal graphics information ARFG. The intersection link information CPLK includes link IDs specifying the links L0 to L5, and pointers to the link record (FIG. 5).

When a given link is an approach link and all the other links are exit links from which the vehicle exits an intersection, the guidance voice information GSCD includes codes (guidance codes), each specifying a voice message guiding the driver to the direction of an exit, and codes (arrow-signal position codes), each indicating the position of an arrow signal that the driver should consider when passing through the intersection. The guidance voice information GSCD includes the same information (guidance codes and arrow-signal position codes) with respect to each case in which any of the links L0 to L5 is an approach link. FIG. 6 shows descriptions of the guidance codes and arrow-signal position codes in the case where the link L0 is an approach link and the links L1 to L5 are exit links.

The intersection-signal placement information CSLP includes data specifying the positions of traffic signals that are visible to the driver when the vehicle is approaching the intersection from an approach link, and a traffic signal to be considered. Since three traffic signals SG1 to SG3 can be seen by the driver when approaching the intersection from the link $L_0$, data specifying the positions of these traffic signals SG1 to SG3 and the traffic signal SG2 to be considered are recorded.

The arrow-signal graphics information ARFG includes data for displaying the arrows AR1 to AR6 in the same directions as those of the arrow signals for the traffic signal SG2 to be referred to.

(D) Structure of Intersection Guidance Unit

Figure 9:
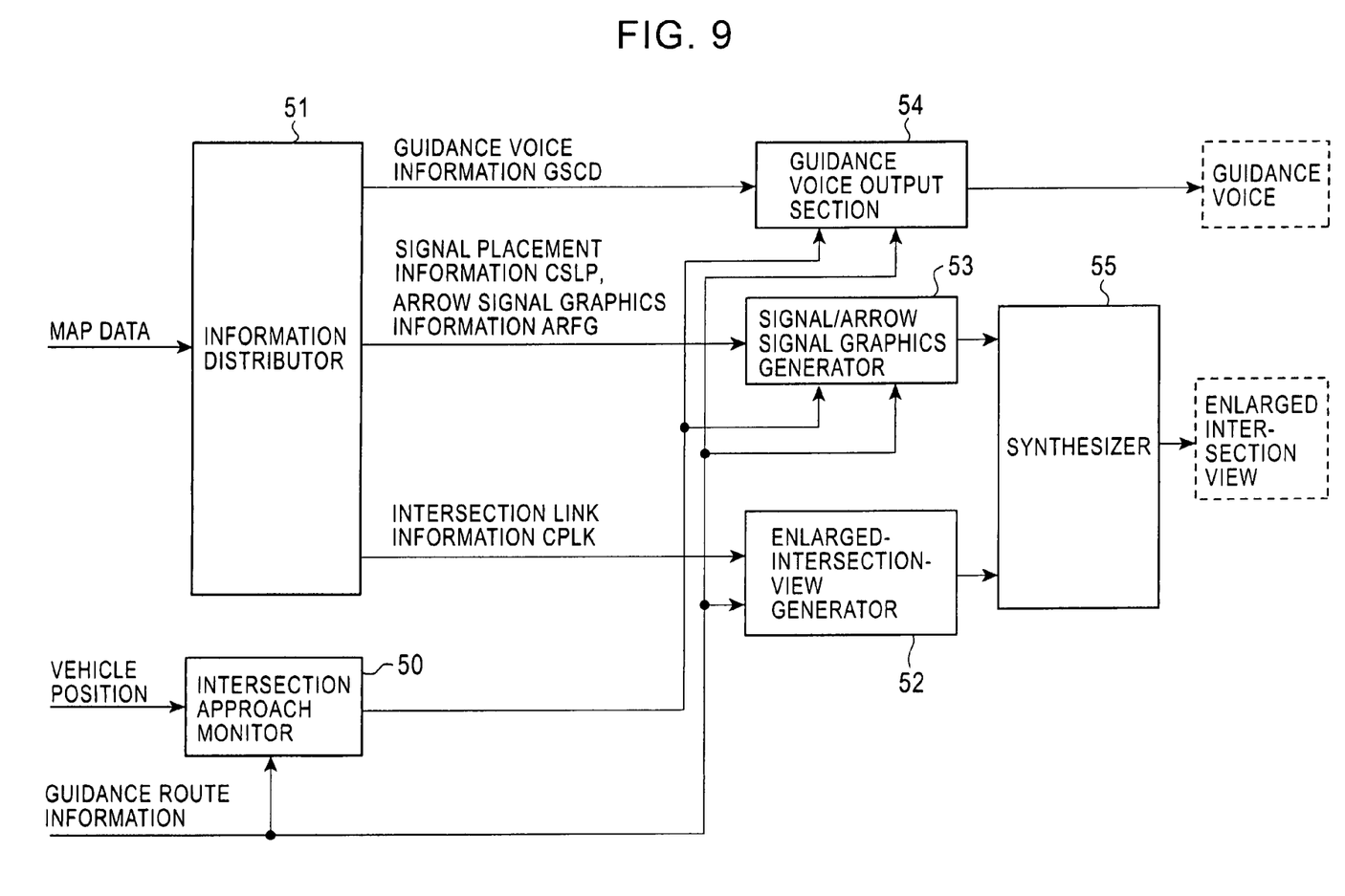
FIG. 9 shows the structure of an intersection guidance unit.

FIG. 9 is a block diagram of the intersection guidance unit 26.

In the intersection guidance unit 26, an intersection approach monitor 50 monitors, with reference to the vehicle position and guidance route information, whether the vehicle is close to a predetermined intersection. If it is determined that the vehicle is close to the intersection, the intersection approach monitor 50 sends approach signals to each section. Of the intersection information contained in map data and specifying the intersection that the vehicle is approaching, the intersection link information CPLK is sent, from an information distributor 51, to an enlarged-intersection-view generator 52 serving as an intersection-view generator, the intersection-signal placement information CSLP and the arrow-signal graphics information ARFG are sent to a signal/arrow-signal graphics generator 53, and the guidance voice information GSCD is sent to a guidance-voice output section 54.

The enlarged-intersection-view generator 52 generates the intersection view CPFG (see FIG. 8) using the intersection link information CPLK when the vehicle approaches the intersection. The signal/arrow-signal graphics generator 53, when the vehicle approaches the intersection, identifies an approach link and exit links with reference to guidance route information, and uses intersection-signal placement information CSLP and arrow-signal graphics information ARFG corresponding to the approach link and exit links to generate, as shown in FIG. 8, the traffic signals SG1 to SG3 and an enlarged view SGNL (including the arrows AR1 to AR6) of the traffic signal SG2. The signal/arrow-signal graphics generator 53 processes and generates graphics of traffic signals and arrows such that the traffic signal SG2 to be considered is displayed in an identifiable manner, and that the arrow AR4 corresponding to the arrow signal permitting the vehicle to proceed in the direction of a guidance route is displayed in a manner so as to be identifiable from the other arrows. The synthesizer 55 synthesizes an intersection view and graphics of traffic signals and arrows (including a highlighted traffic signal and arrow) to produce the intersection view shown in FIG. 8.

The guidance-voice output section 54, when the vehicle approaches the intersection, identifies an approach link and exit links with reference to guidance route information, and uses the guidance voice information GSCD corresponding to the approach link and exit links to create and send a guidance message (such as "Take a right at the next intersection. Please refer to the second arrow signal from the right") to the audio unit 109. Upon receipt, the audio unit 109 turns the guidance message into a voice message and produces it from a speaker.

Figure 10:
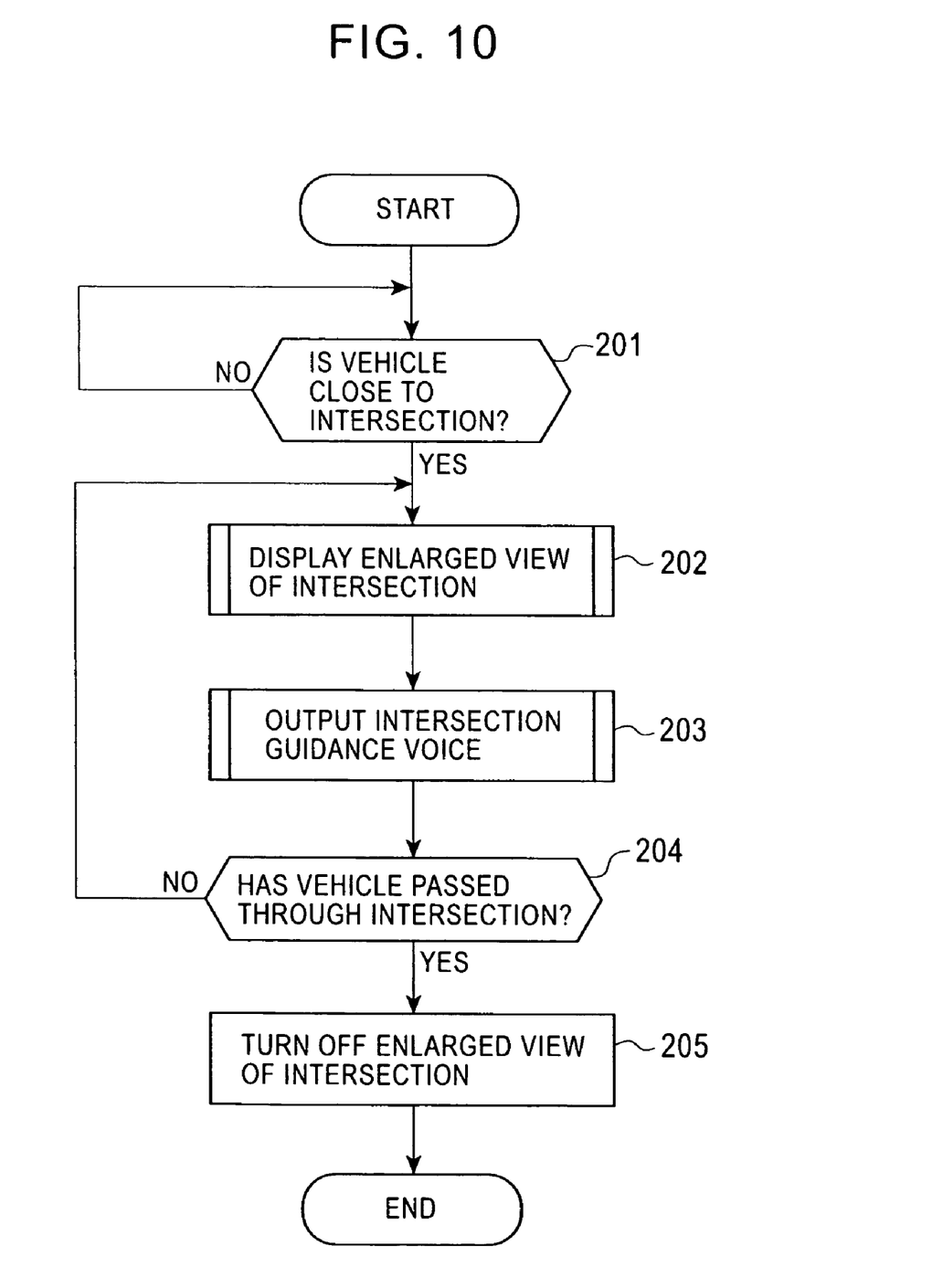
FIG. 10 is a flowchart showing the process of intersection guidance.

FIG. 10 is a flowchart showing the process of intersection guidance in the intersection guidance unit 26.

The intersection approach monitor 50 of the intersection guidance unit 26 monitors whether the vehicle is close to an intersection (step 201). If it is determined that the vehicle is close to the intersection, the enlarged-intersection-view generator 52 and the signal/arrow-signal graphics generator 53 generate an intersection view and graphics of traffic signals and arrow signals, respectively, which are then synthesized such that the graphics of traffic signals and arrow signals are displayed on the intersection view as shown in FIG. 8. Moreover, a traffic signal to be considered and an arrow corresponding to an arrow signal permitting the vehicle to proceed in the direction of a guidance route are displayed in an identifiable manner (step 202). In FIG. 8, the traffic signal SG2 flashes and the arrow AR4 is highlighted in boldface type.

Next, the guidance-voice output section 54 produces a guidance message indicating the direction of travel and the position of the arrow signal to be considered (step 203). Then the intersection guidance unit 26 monitors whether the vehicle has passed through the intersection (step 204). If the vehicle has not yet passed through the intersection, the process from step 202 is repeated. If it is determined that the vehicle has passed through the intersection, the display of the intersection view is turned off and a map is displayed on the entire screen (step 205).

Figure 11:
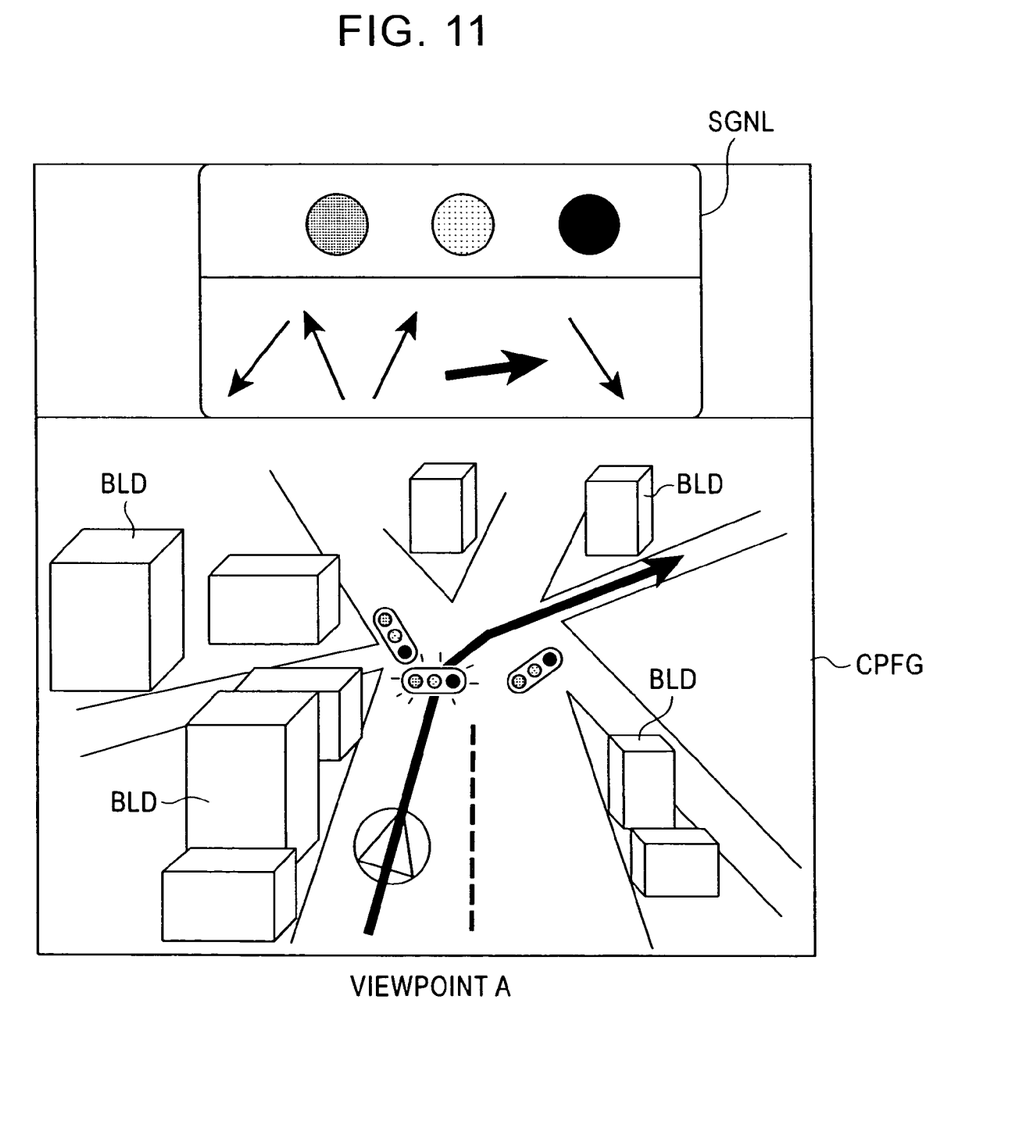
FIG. 11 is an intersection view in which surrounding buildings BLD are displayed in three dimensions.
Figure 12:
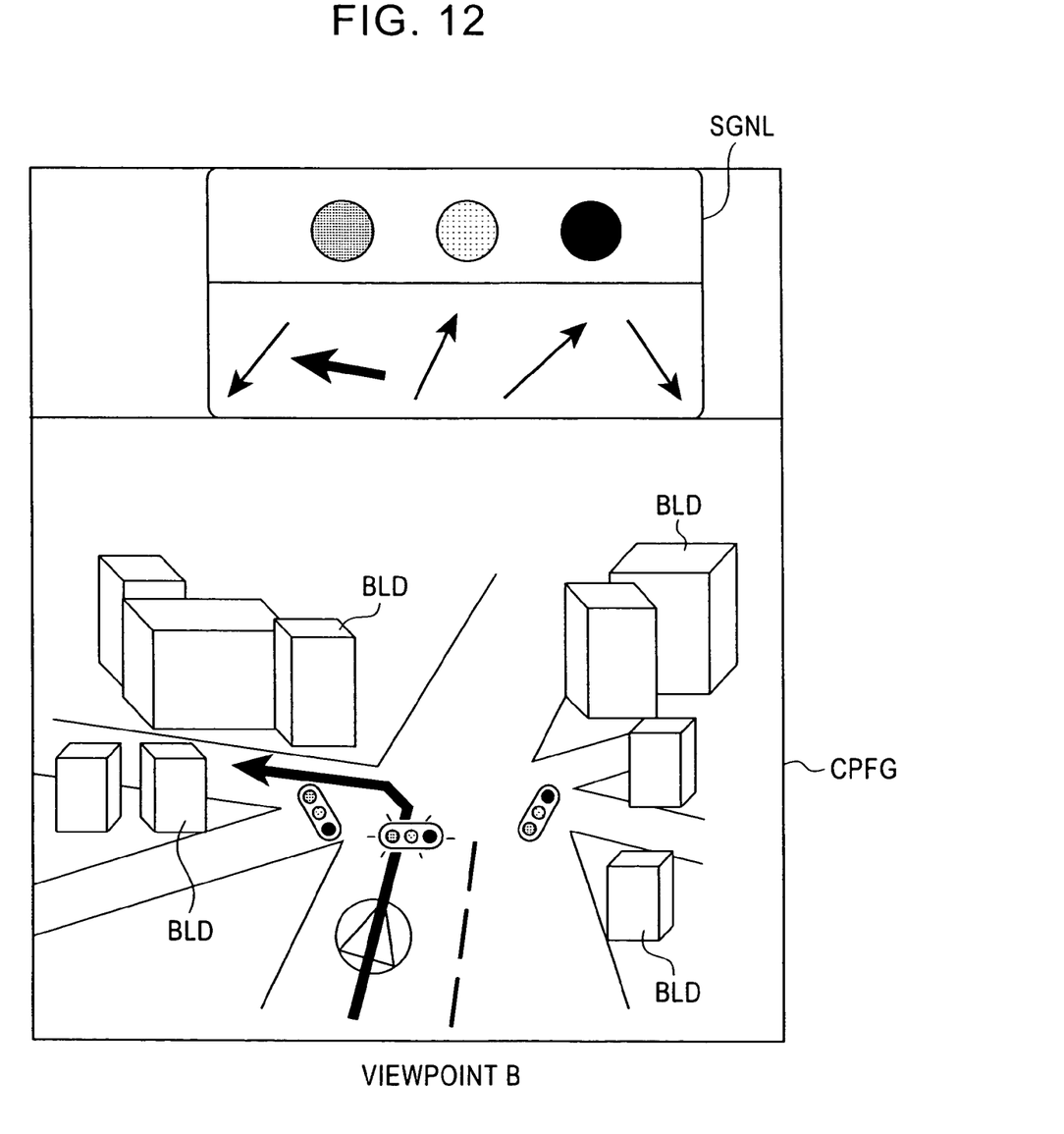
FIG. 12 is an intersection view from another angle and in which surrounding buildings BLD are displayed in three dimensions.
Figure 13:
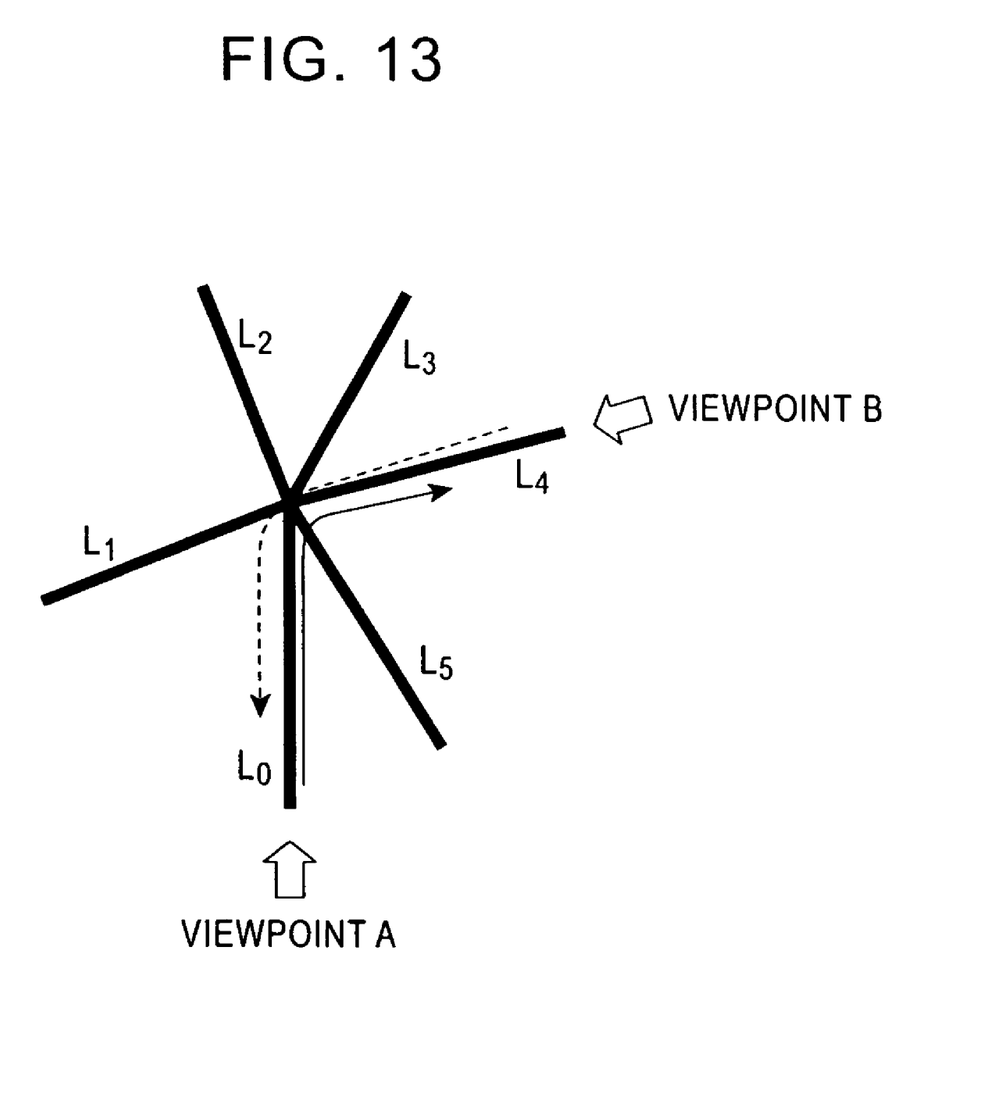
FIG. 13 shows an example of the configuration of an intersection and illustrates viewpoints in FIG. 11 and FIG. 12.

While no surrounding building is displayed on the intersection views in the embodiment described above, surrounding buildings BLD may be displayed in three dimensions, as in FIG. 11 and FIG. 12. FIG. 11 and FIG. 12 are intersection views from a viewpoint A and a viewpoint B, respectively, in an intersection shown in FIG. 13.

When a map is displayed in three dimensions, there is no need to draw a new intersection view, because the scale of the three-dimensional map is already as large as that of the intersection view. In this case, traffic signals and arrows are shown on the three-dimensional map, and a traffic signal to be considered and an arrow corresponding to an arrow signal to be considered are highlighted.

Figure 2:
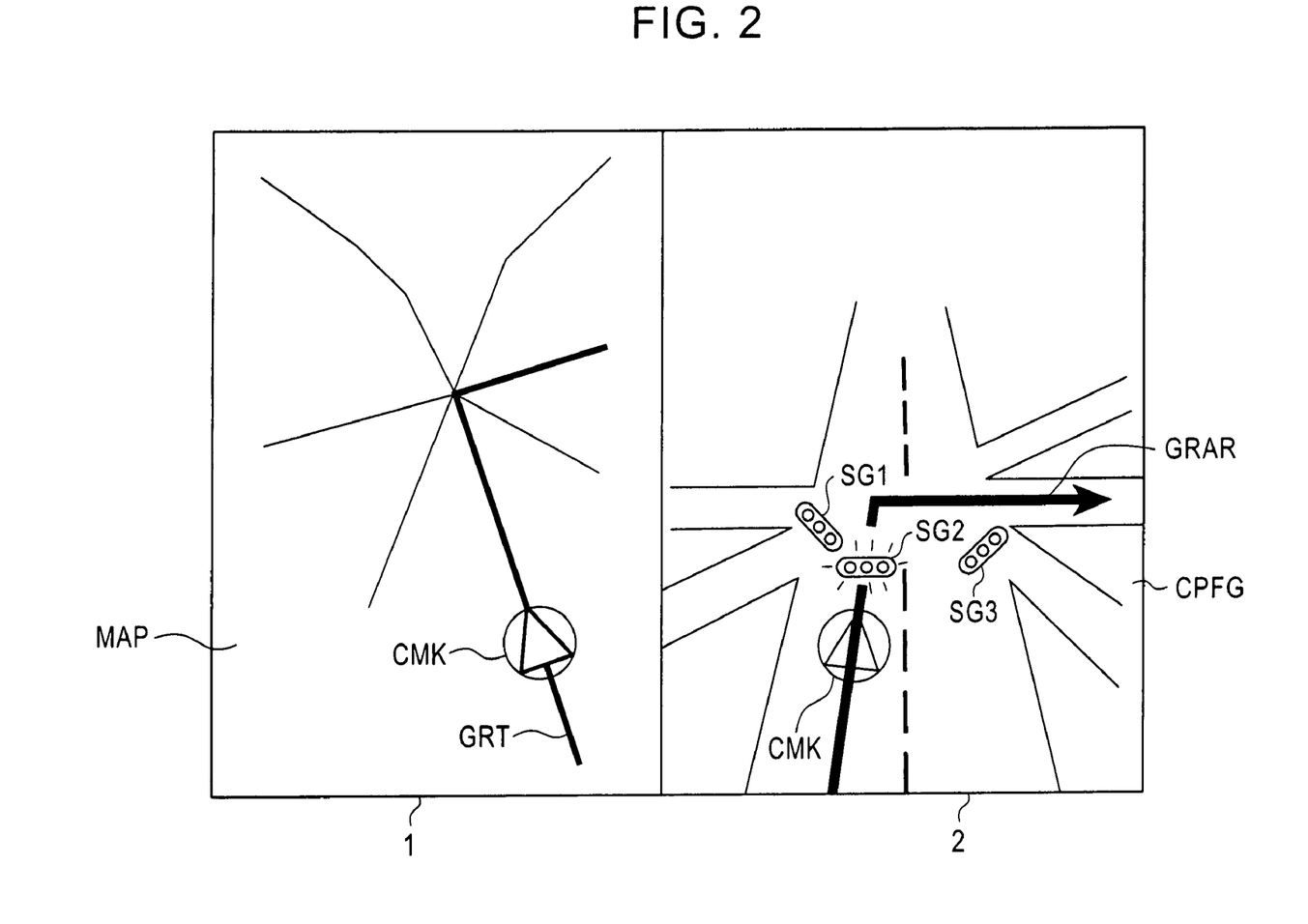
FIG. 2 shows another screen example of the present invention.
Figure 3:
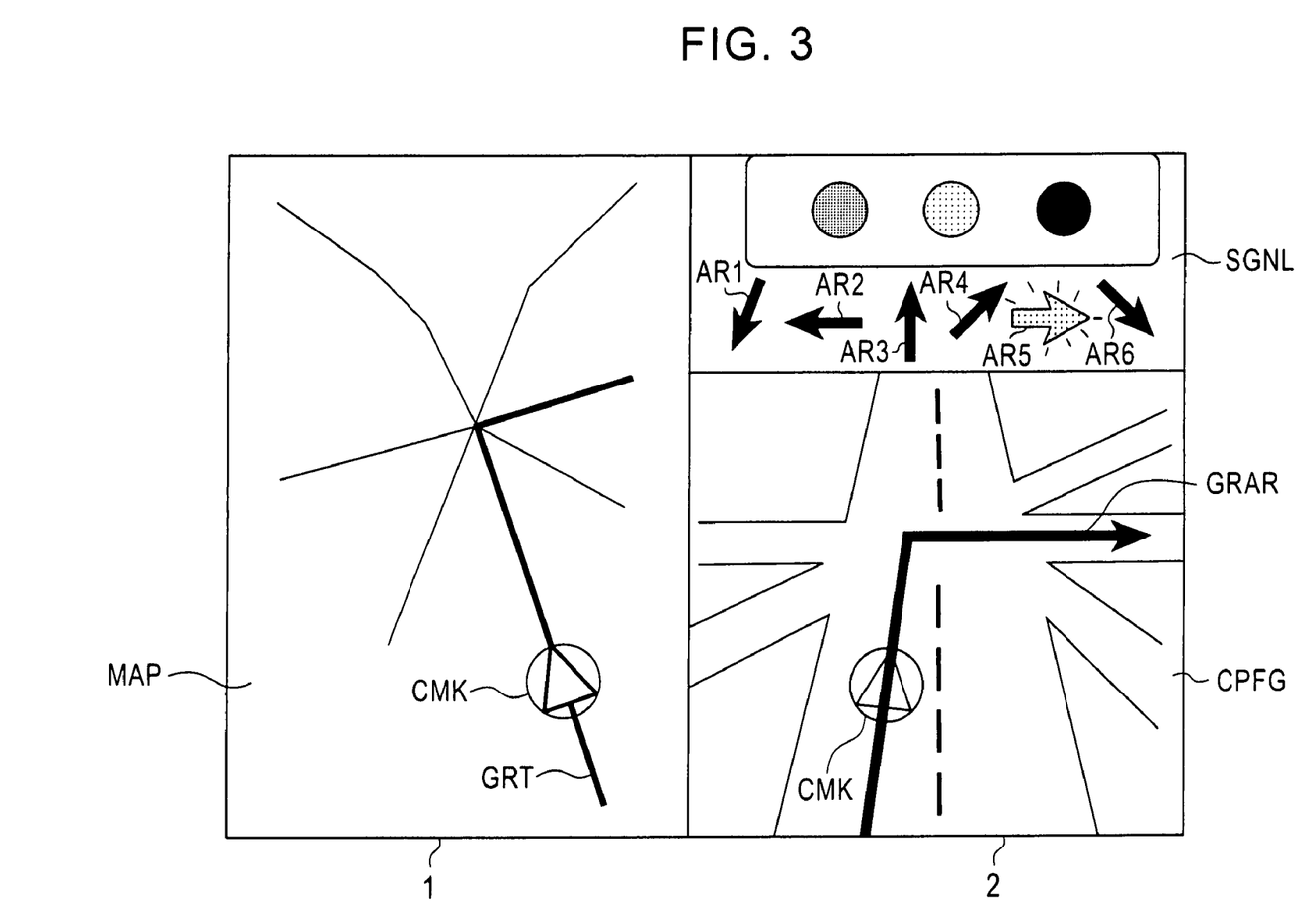
FIG. 3 shows still another screen example of the present invention.

In the embodiment described above, traffic signals and arrows corresponding to arrow signals are displayed at the same time. However, the screen can be easily changed such that only traffic signals or only arrows are displayed as shown in FIG. 2 and FIG. 3.

In the present invention described above, a traffic signal and arrow signal to be considered at a forked intersection are clearly indicated to the driver. This reduces the driver's stress at the intersection, prevents the vehicle from stalling at the intersection due to the driver's errors in identifying the traffic signal and arrow signal to be considered, thereby preventing traffic accidents and congestion.

The embodiments according to the present invention are described above only for illustrative purposes and do not limit the technical scope of the present invention. That is, the present invention may be embodied in other specific forms without departing from the spirit or essential characteristics thereof.

What is claimed is:

1. An intersection guidance method in a navigation system, the method comprising:
    displaying a plurality of traffic signals located at an intersection on an intersection view when a vehicle approaches the intersection, wherein the plurality of traffic signals are displayed at positions corresponding to their actual positions at the intersection; and
    displaying a traffic signal to be considered for guidance in a manner so as to be identifiable from the other displayed traffic signals, where the traffic signal to be considered for guidance is a traffic signal controlling the progress of the vehicle along a guidance route.

2. The intersection guidance method according to claim 1, wherein intersection information in map data includes, with respect to each case in which any of the intersection links constituting an intersection is an approach road to the intersection, data specifying the positions of traffic signals to be displayed and a traffic signal to be considered; and, using the intersection information, the traffic signals are displayed and the traffic signal to be considered is displayed in an identifiable manner.

3. The intersection guidance method according to claim 1, wherein arrows in the same directions as those of arrow signals for the traffic signal to be considered are displayed; and an arrow corresponding to an arrow signal permitting the vehicle to proceed in the direction of a guidance route is displayed in a manner so as to be identifiable from the other arrows.

4. The intersection guidance method according to claim 3, wherein the vehicle is monitored to determine whether or not the vehicle is close to the intersection, and the intersection view is displayed if it is determined that the vehicle is close to the intersection.

5. The intersection guidance method according to claim 3, wherein intersection information in map data includes, with respect to each case in which any of the intersection links constituting an intersection is an approach road to the intersection, the positions of traffic signals to be displayed, data specifying a traffic signal to be considered, and data for displaying arrows in the same directions as those of arrow signals for the traffic signal to be considered; and, using the intersection information, the traffic signals and the arrows are displayed, the traffic signal to be referred to is displayed in an identifiable manner, and an arrow corresponding to an arrow signal permitting the vehicle to proceed in the direction of a guidance route is displayed in a manner so as to be identifiable from the other arrows.

6. The intersection guidance method according to claim 5, wherein the intersection information includes voice data indicating the position of the arrow signal to be considered, and a voice message based on the voice data informs the driver of the position of the arrow signal to be considered.

7. An intersection guidance method in a navigation system, the method comprising:
displaying a plurality of arrows in the same directions as those of arrow signals on a traffic signal to be considered for guidance on an intersection view when a vehicle approaches an intersection; and
displaying an arrow corresponding to an arrow signal controlling the progress of the vehicle along a guidance route in a manner so as to be identifiable from the other displayed arrows.

8. The intersection guidance method according to claim 7, wherein the vehicle is monitored to determine whether or not the vehicle is close to the intersection, and the intersection view is displayed if it is determined that the vehicle is close to the intersection.

9. The intersection guidance method according to claim 7, wherein intersection information in map data includes, with respect to each case in which any of the intersection links constituting an intersection is an approach road to the intersection, data for displaying arrows in the same directions as those of arrow signals for a traffic signal to be considered; and, using the intersection information, the arrows are displayed, and an arrow corresponding to an arrow signal permitting the vehicle to proceed in the direction of a guidance route is displayed in a manner so as to be identifiable from the other arrows.

10. The intersection guidance method according to claim 9, wherein the intersection information includes voice data indicating the position of the arrow signal to be considered, and a voice message based on the voice data informs the driver of the position of the arrow signal to be considered.

11. A navigation system with intersection guidance functions, comprising:
an intersection approach monitor detecting that a vehicle is close to an intersection;
a map memory;
a map data storage retrieving map data of the area around the vehicle from the map memory, and storing the map data; and
a display unit displaying, using intersection information included in the map data, a plurality of traffic signals located at the intersection on an intersection view when the vehicle approaches an intersection, and displaying in an identifiable manner a traffic signal from among the plurality of displayed traffic signals to be considered for guidance in passing through the intersection, wherein the plurality of traffic signals are displayed at positions corresponding to their actual positions at the intersection, and the traffic signal to be considered for guidance is a traffic signal controlling the progress of the vehicle along a guidance route.

12. The navigation system according to claim 11, wherein the intersection information includes, with respect to each case in which any of the intersection links constituting an intersection is an approach road to the intersection, information specifying the positions of traffic signals to be displayed and a traffic signal to be considered; and the display unit, using the intersection information, displays the traffic signals on an intersection view and displays the traffic signal to be considered in an identifiable manner.

13. The navigation system according to claim 11, wherein the display unit, using the intersection information included in the map data, displays arrows in the same directions as those of arrow signals for the traffic signal to be considered, and displays an arrow corresponding to an arrow signal permitting the vehicle to proceed in the direction of a guidance route in a manner so as to be identifiable from the other arrows.

14. The navigation system according to claim 13, wherein the intersection information includes, with respect to each case in which any of the intersection links constituting an intersection is an approach road to the intersection, information specifying the positions of traffic signals to be displayed, a traffic signal to be considered, and arrows in the same directions as those of arrow signals for the traffic signal to be considered; and the display unit, using the intersection information, displays the traffic signals and arrows, displays the traffic signal to be considered in an identifiable manner, and displays an arrow corresponding to an arrow signal permitting the vehicle to proceed in the direction of a guidance route in a manner so as to be identifiable from the other arrows.

15. The navigation system according to claim 13, further comprising a voice output unit informing the driver of the position of the arrow signal to be considered by using voice data that is included in the intersection information and indicates the position of the arrow signal to be considered.

16. The navigation system according to claim 13, further comprising an intersection-view generator generating and displaying, using the intersection information, an intersection view when the vehicle approaches an intersection.

17. A navigation system with intersection guidance functions, comprising:
an intersection approach monitor detecting that a vehicle is close to an intersection;
a map memory;
a map data storage retrieving map data of the area around the vehicle from the map memory, and storing the map data; and
a display unit displaying, using intersection information included in the map data, a plurality of arrows in the same directions as those of arrow signals on a traffic signal to be considered for guidance on an intersection view when the vehicle approaches the intersection, and displaying an arrow corresponding to an arrow signal controlling the progress of the vehicle along a guidance route in a manner so as to be identifiable from the other displayed arrows.

18. The navigation system according to claim 17, wherein the intersection information includes, with respect to each case in which any of the intersection links constituting an intersection is an approach road to the intersection, information specifying arrows in the same directions as those of arrow signals for a traffic signal to be considered; and the display unit, using the intersection information, displays the arrows and displays an arrow corresponding to an arrow signal permitting the vehicle to proceed in the direction of a guidance route in a manner so as to be identifiable from the other arrows.

19. The navigation system according to claim 17, further comprising an intersection-view generator generating and displaying, using the intersection information, an intersection view when the vehicle approaches an intersection.

20. The navigation system according to claim 17, further comprising a voice output unit informing the driver of the position of the arrow signal to be considered using a voice message based on voice data included in the intersection information and indicating the position of the arrow signal to be considered.

* * * * *